Patented Apr. 14, 1931

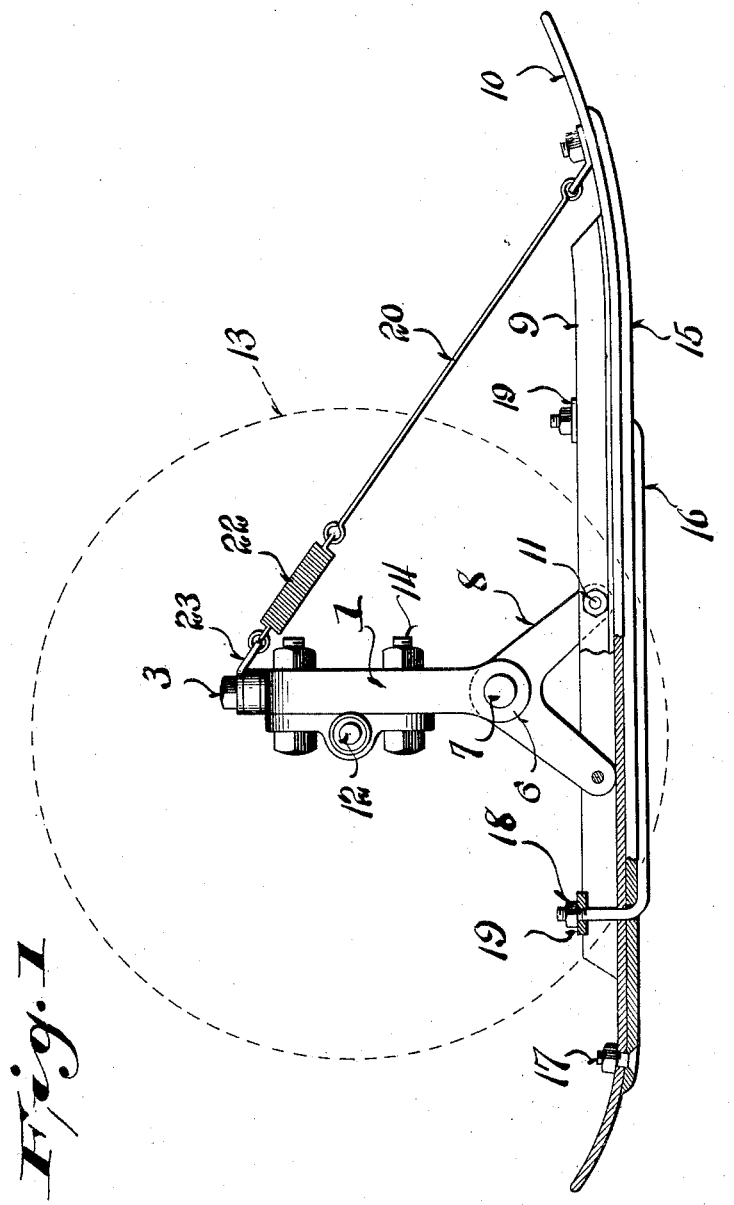

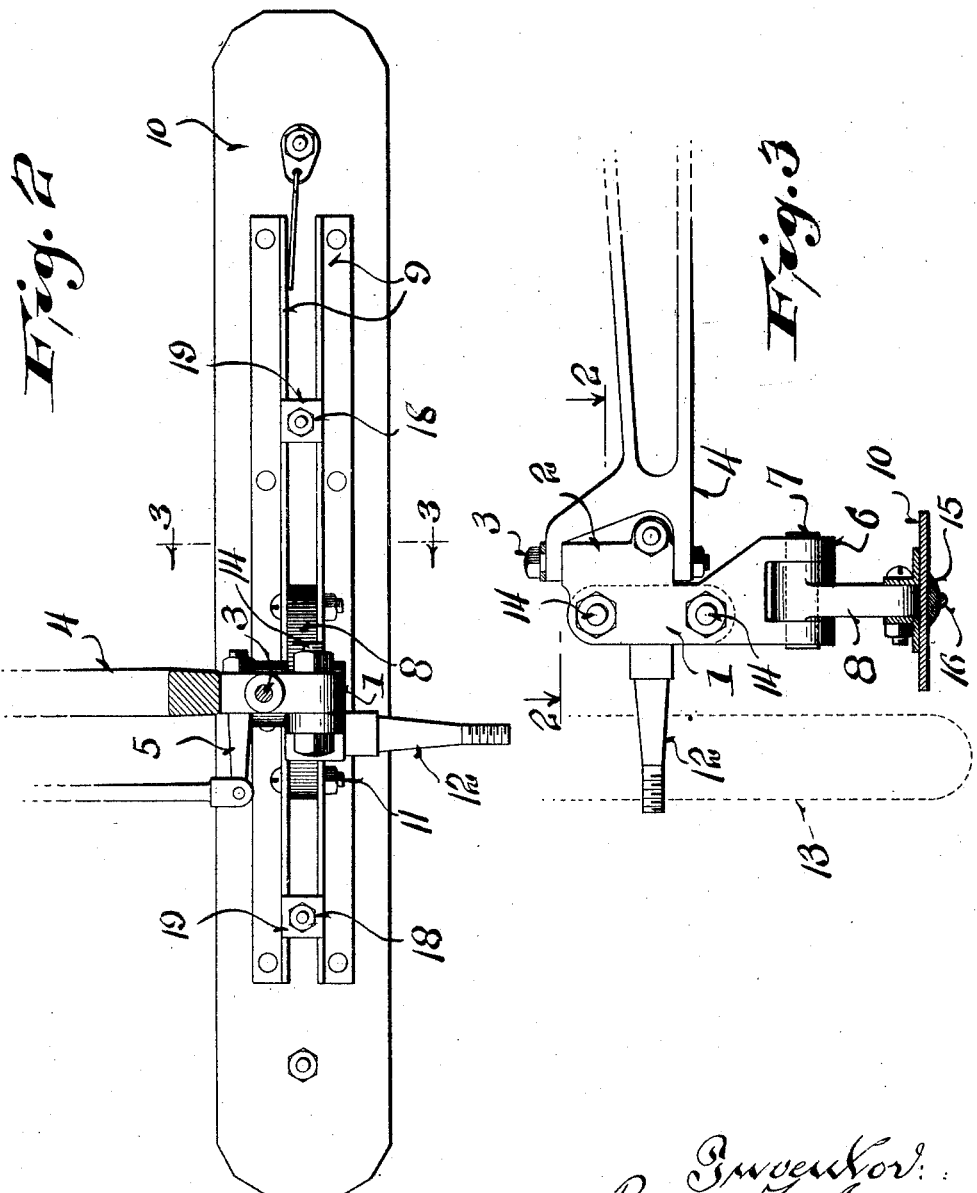

1,800,812

UNITED STATES PATENT OFFICE

BRUNO F. ARPS, OF NEW HOLSTEIN, WISCONSIN

RUNNER AND WHEEL ASSEMBLY

Application filed December 1, 1927. Serial No. 236,963.

This invention relates to runners for automobiles adapted to be used in the snow and is particularly directed to a runner and wheel assembly.

Objects of this invention are to provide a novel form of runner and wheel assembly in which the runner pivot and the wheel pivot are mounted separately, in which the runner pivot is below the wheel pivot or axle so that the runner pivot may be positioned very low to prevent the rolling of the runner or digging of its front end into the snow.

It is to be noted particularly that runners as heretofore constructed frequently dig into the snow and tend to turn as a wheel. However, this invention overcomes the defect noted above, as the pivot point for the runner is mounted very low and at a considerable distance below the axle of the wheel but in the plane of the vertical axis about which the assembly is rocked.

Further than this, this invention obtains the important result that the frictional force is applied to the assembly at a point very close to the spindle pivot line. This prevents the tendency of the machine to turn in the snow when one runner encounters greater friction than the other runner, and thus overcomes one of the difficulties heretofore encountered in snow automobiles.

Further objects are to provide a runner and wheel construction in which the wheel spindle is offset rearwardly of the runner spindle and of the vertical axis about which the assembly is rocked. This construction materially reduces the effort of steering in snow as it has been found extremely difficult to steer the front wheels when their spindles are in the same plane as the vertical axis about which the wheels and spindles rock.

Further objects are to provide a runner and wheel assembly in which the runner is held up at its front out of contact with the ground when the wheels encounter a bare roadway so that the wheels will support the runners clear of the ground without danger of the front end of the runners digging into the ground.

Further objects are to provide a wheel and runner assembly in which the wheel may be readily removed without disturbing the runner when there is no possible chance of encountering bare roads and to provide a recovering bare roads and to provide a removable keel or rod that passes beneath the entire runner and aids in preventing side slipping while permitting ready renewal in the event that the keel becomes worn.

An embodiment of the invention is shown in the accompanying drawings in which:—

Figure 1 is a side view of the runner and wheel assembly showing the wheel in dotted lines and a portion of the runner in section;

Figure 2 is a plan view of the structure shown in Figure 1;

Figure 3 is a sectional view on the line 3—3 of Figure 2.

Referring to the drawings, it will be seen that the assembly comprises a spindle bracket having a vertical body portion 1 and having an offset portion 2 through which the vertical bolts 3 of the front axle 4 extend. This offset portion is provided with a lug 5 which is attached to the connecting rod of the steering mechanism, as shown in Figure 2. The body portion of the bracket is provided with a downwardly extending part having spaced apertured lugs 6 through which the pintle pin 7 passes. Between these lugs, a V-shaped foot 8 is pivotally mounted and carried by the pin 7. This V-shaped foot 8, as may be seen from Figure 1, has its ends positioned between the spaced angle irons 9 of the runner 10. These spaced arms of the foot 8 are secured in place by means of the bolts 11. The spindle 12 for the wheel 13 is detachably secured to the bracket or body portion by means of the bolts 14. This permits ready removal of the wheel when desired without disturbing the runner in any manner.

The runner is provided with a sole or auxiliary bearing portion 15, and is provided with a sub-sole or keel 16. The sole 15 may be retained in place by means of the countersunk bolts 17. The keel or removable member 16 is an elongated U-bolt whose ends pass upwardly through the sole and through the runner and are threaded and receive the nuts 18. These nuts bear upon transverse plates 19 carried by the angle irons 9, as shown in Figures 1 and 2. Thus, when the keel is worn, it may be readily replaced without disturbing other portions of the runner. In addition to this, the keel aids in preventing side slipping. The front of the runner is yieldingly supported by means of the rod 20 whose rear upper end is attached to the spring 22. The upper end of the spring is attached to a clip 23 positioned beneath the head of the bolt 3, as shown in Figure 1.

It is to be particularly noted that the pivot point of the runner is very close to the runner itself and is in the plane of the vertical axis about which the assembly is rocked. Further, this pivot point for the runner is at a position materially below the spindle of the wheel. This construction avoids any tendency of the runner to rock or roll like a wheel and cause the front end to dig into the snow. Instead, the front end rides freely over the snow as the pivot point about which the runner rocks is at this very low position.

In addition to this, the frictional drag upon the runner is imparted to the body portion of the spindle at a low point and substantially in the plane of the vertical axis, and also practically beneath such axis, as may be seen from Figure 3. This insures ease of steering so much desired and heretofore unobtained in snow automobiles.

It is to be noted further that this ease of steering is also augmented by the positioning of the wheel spindle 12 rearwardly of the vertical axis, as illustrated in Figures 1 and 2. The wheel is offset and acts as a castor. Obviously in soft snow the tendency to rock the wheel is very much more pronounced than when running on a hard road and consequently this construction cooperates materially with the construction of runner in providing ease of steering.

When a bare road is encountered, the wheel supports the runner clear of the ground. The resilient support for the front end of the runner prevents engagement of the runner with the ground.

It is also clear that the wheels may be very readily removed by merely removing the bolts 14 when there is no danger of encountering any bare portions in the roadway.

It will be seen that a very simple type of wheel and runner assembly has been provided by this invention which is eminently practical, which is easy to make, and which is easy to apply to an automobile.

Attention is called to the fact that as shown in Figure 3 of the drawings, the foot 8 is offset with relation to its hub and it follows that in the offset position shown in conjunction with the opposite foot, not shown, the runners 10 are spaced apart their maximum width. When it is desired to narrow the width for tracking purposes, the runners can be reversed, whereby the offset of the foot 8 will be inward, thus narrowing the tread. In other words, by reversal of the runners, due to this offset, the tread may be varied from maximum to minimum width.

Although the invention has been described in considerable detail, such description is intended as illustrative rather than limiting, as the invention may be variously embodied and as the scope of such invention is to be determined as claimed.

I claim:

A runner assembly for vehicles comprising a body portion disposed in a vertical plane, an offset portion at the outer end of the body formed with a bolt receiving aperture for receiving an axle supporting bolt, spaced apertured lugs depending from the lower end of the body with one of said lugs offset from the vertical plane of the body, a foot pivotally mounted between said apertured lugs and a spindle removably attached to the body at one side thereof and lying in a plane at right angles to the body and in alignment with the lower end of the offset portion, said spindle being independent of the axle.

In testimony that I claim the foregoing I have hereunto set my hand at Milwaukee, in the county of Milwaukee and State of Wisconsin.

BRUNO F. ARPS.